United States Patent
Gehring

(10) Patent No.: US 6,855,915 B2
(45) Date of Patent: Feb. 15, 2005

(54) OUTDOOR-USE HEATING MAT SYSTEM

(76) Inventor: Michael Gehring, 5511 Brazo La., Fort Wayne, IN (US) 46818

(*) Notice: Subject to any disclaimer, the term of this patent is extended or adjusted under 35 U.S.C. 154(b) by 0 days.

(21) Appl. No.: 10/457,334

(22) Filed: Jun. 6, 2003

(65) Prior Publication Data
US 2004/0245234 A1 Dec. 9, 2004

(51) Int. Cl.⁷ .................................................. H05B 1/00
(52) U.S. Cl. ........................................ 219/213; 219/528
(58) Field of Search ................................ 219/213, 544, 219/476, 480, 528, 549; 392/432, 435, 436

(56) References Cited

U.S. PATENT DOCUMENTS

| | | | |
|---|---|---|---|
| 2,745,942 A | * | 5/1956 | Cohen ........................ 219/528 |
| 2,844,696 A | | 7/1958 | Custer, Jr. |
| 4,197,449 A | * | 4/1980 | Fessenden .................. 219/549 |
| 4,794,228 A | * | 12/1988 | Braun, Jr. .................... 219/415 |
| 4,967,057 A | | 10/1990 | Bayless et al. |
| 5,003,157 A | * | 3/1991 | Hargrove .................... 219/213 |
| 5,461,213 A | * | 10/1995 | Rodin ......................... 219/213 |
| 5,550,350 A | * | 8/1996 | Barnes ........................ 219/213 |
| 5,591,365 A | | 1/1997 | Shields |
| 5,614,292 A | | 3/1997 | Saylor |
| 5,637,247 A | | 6/1997 | Flynn, Jr. |
| 5,908,573 A | * | 6/1999 | Chiles et al. ............... 219/545 |
| 5,948,303 A | * | 9/1999 | Larson ....................... 219/486 |
| 6,184,496 B1 | * | 2/2001 | Pearce ........................ 219/213 |
| 6,211,493 B1 | | 4/2001 | Bouman |
| 6,278,085 B1 | | 8/2001 | Abukasm |
| 6,294,768 B1 | | 9/2001 | Liebich |
| 6,621,983 B2 | * | 9/2003 | Thorin ........................ 392/435 |

* cited by examiner

Primary Examiner—Robin O. Evans
Assistant Examiner—Vinod Patel
(74) Attorney, Agent, or Firm—Barnes & Thornburg LLP

(57) ABSTRACT

An outdoor-use heating mat system includes at least one heating mat. At least one heating mat of the system includes a first structural layer, a heating element, a plurality of intermediate strips, a second structural layer, and at least one of a cord and a plug. The first and second structural layers each are both durable and electrically insulating. The first such layer has a plurality of first layer edges associated therewith. The heating element positioned above the first structural layer. The plurality of intermediate strips are mounted upon the first structural layer. Each intermediate strip is positioned proximate at least one of one the first layer edge and the heating element. The second structural layer is mounted to the plurality of intermediate strips opposite the first structural layer.

26 Claims, 3 Drawing Sheets

OUTDOOR-USE HEATING MAT SYSTEM

BACKGROUND OF THE INVENTION

1. Field of the Invention

The present invention relates to an outdoor-use heating mat system subjected to pedestrian and/or vehicular traffic and configured for keeping itself essentially free of ice and/or snow.

2. Description of the Related Art

In an attempt to keep areas such as steps, sidewalks, driveways, ramps, decks, balconies, porches, bridges, walkways, or other surfaces subjected to pedestrian and/or vehicular traffic clear of snow and/or ice during wintery conditions, various heating mat systems have been developed for use on such surfaces. Such heating mats typically have a heating element embedded between layers or a matrix of a durable, electrically-insulating material. The heating mats of such systems are often configured so as to be capable of being electrically interconnected and, in some instances, mechanically interconnected.

One problem that exists with heating mat systems of the prior art is that the heating element tends to be mounted within these mats in such a fashion so as to potentially be weight-bearing as traffic proceeds across the mat. That the heating element may have to bear a significant amount of weight can pose a problem in an instance where the heating element material is not as durable as the outer covering materials. Further, the heating element may be quite possibly be the portion of the mat most prone to wear and/or breakage and potentially the most costly component of the entire mat, both to originally produce and possibly replace. Furthermore, depending on how the mat is constructed, replacement of a worn or failed heating element may not be possible.

It is known in the prior art to use a temperature control system with respect to an outdoor heating mat. Such a thermostat is typically designed to supply a given amount of power to each heating element section within the heating mat. However, in actual operation it may not always be necessary to heat each and every element portion (at least not to the same degree) within the mat, in order to achieve sufficient melting of ice and/or snow thereupon.

What it needed in the art is a system for encasing the electrical element of the heating mat in such a fashion that reduces or eliminates the amount of weight that the heating element must bear when the mat is subjected to traffic.

What is further needed in the art is a series of heating elements which can be selectively activated by a thermal control (e.g., in a free element system, one, two, or three of the elements can be activated to thereby allow for low, medium, and high heat settings), thereby allowing for greater control over the amount of power to be consumed by the heating mat.

SUMMARY OF THE INVENTION

The present invention, in one form thereof, comprises an outdoor-use heating mat system, the heating mat system including at least one heating mat. At least one heating mat includes a first structural layer, a heating element, a plurality of intermediate strips, a second structural layer, and at least one of a cord and a plug. The first structural layer is both durable and electrically insulating and has a plurality of first layer edges associated therewith. The heating element positioned above the first structural layer. The plurality of intermediate strips are mounted upon the first structural layer. Each intermediate strip is positioned proximate at least one of one the first layer edge and the heating element. The second structural layer is both durable and electrically insulating. The second structural layer is mounted to the plurality of intermediate strips opposite the first structural layer. The first structural layer, the intermediate strips, and the second structural layer, together, form an element enclosure for the heating element. The cord and/or plug is electrically connected to the heating element and extends outside of the element enclosure.

The present invention, in another form thereof, comprises an outdoor-use heating mat including a base structural layer, a heating element, a plurality of intermediate strips, a traffic-exposed structural layer, and at least one of a cord and a plug. The base structural layer has a plurality of base layer edges, and the heating element is positioned above said base structural layer. The plurality of intermediate strips are mounted upon said base structural layer. Each intermediate strip is positioned proximate at least one of one base layer edge and the heating element. The traffic-exposed structural layer is mounted to the plurality of intermediate strips opposite the base structural layer and above the heating element. The cord and/or plug is electrically connected to the heating element.

An advantage of the present invention is that the intermediate strips or spacing width of the heating mat help maintain the regularity of thickness of the overall heating mat, even when subjected to traffic traversing thereacross.

Another advantage of the present invention is that the intermediate strips of the mat absorb a portion of the shock and weight of the traffic coming across the mat and are thereby able to reduce or eliminate the amount of weight which would be carried by or applied to the heating element (s) within the mat.

Yet another advantage of the present invention is that multiple, separately activated heating elements can be employed within the heating mat, the heating elements being controllable by a single switch. This setup allows for multiple temperature settings by permitting a controlled member of elements to be powered at any given instance.

A further advantage of the present invention is that an embodiment is available which employs a specially made heat tape the size of the entire area of the mat, the heat tape being governed by a temperature sensor that would effectively be able to govern the heat output of the mat, so that the system does not use as much power in warmer temperatures.

Yet another advantage of the present invention is that larger mats can be provided with a non-electronic surgister-type device that would allow the heating element(s) thereof to turn on in stages to damp or lessen current spikes that could potentially cause a circuit breaker to trip open.

Another advantage of the present invention is that an upper surface of a traffic-bearing layer can be provided with a non-skid texture and/or ribbing thereon to improve the traction that can be gained relative to that upper surface. The ribbing also has a further advantage of providing a means for channeling water off of the traffic-exposed layer. It is noted that it could prove advantageous to provide such non-skid texture and/or ribbing on the bottom face of the mat to better ensure that it remains in its desired location (i.e., is not prone to slippage) and, when ribbing is used, to channel water from below the mat.

BRIEF DESCRIPTION OF THE DRAWINGS

The above-mentioned and other features and advantages of this invention, and the manner of attaining them, will become more apparent and the invention will be better understood by reference to the following description of various embodiments of the invention taken in conjunction with the accompanying drawings, wherein.

Figure 1:
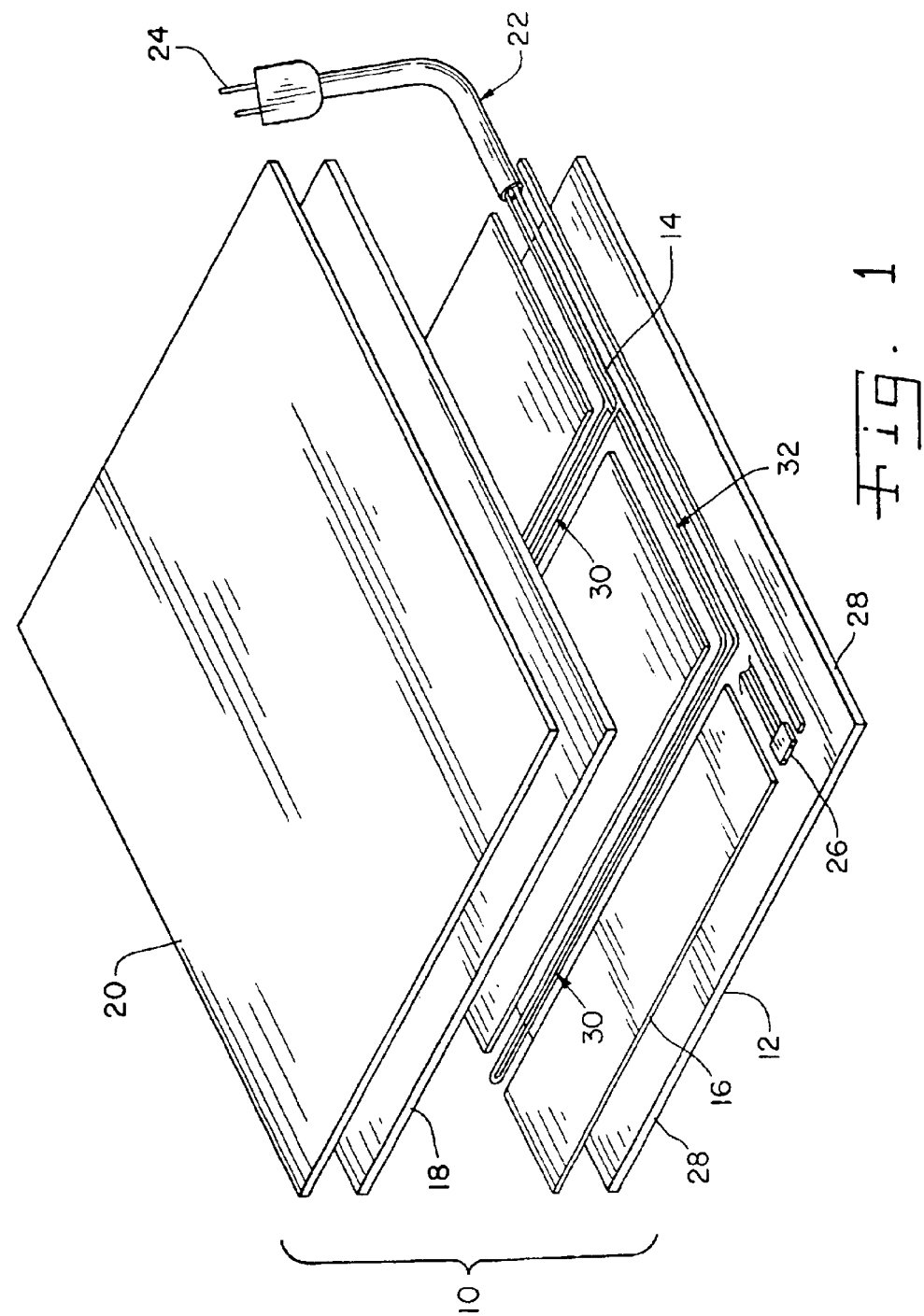
FIG. 1 is an exploded, perspective view of an outdoor-use heating mat of the present invention.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF THE INVENTION

Figure 2:
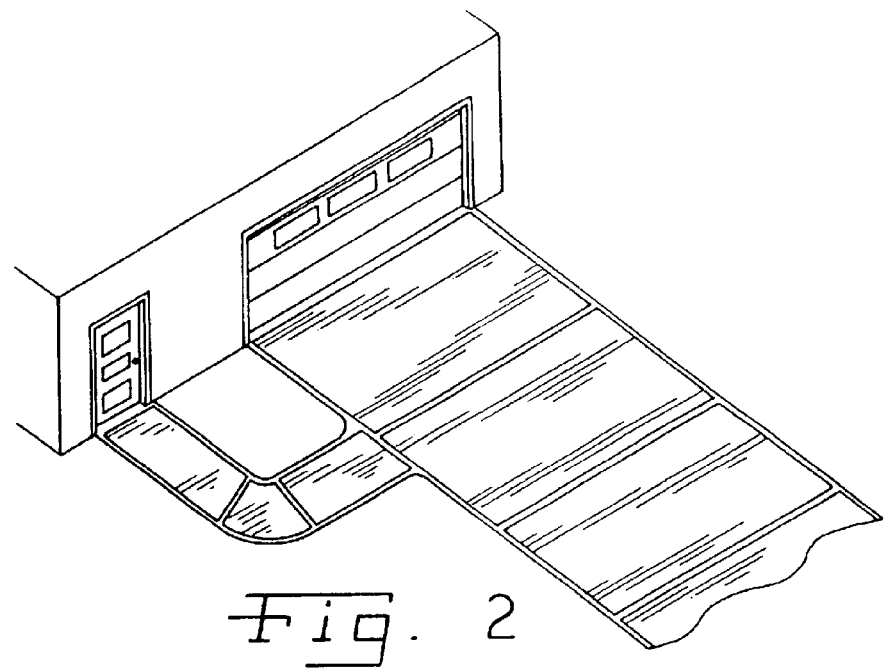
FIG. 2 is a perspective view of an outdoor-use heating mat system application for a walkway and a driveway.
Figure 3:
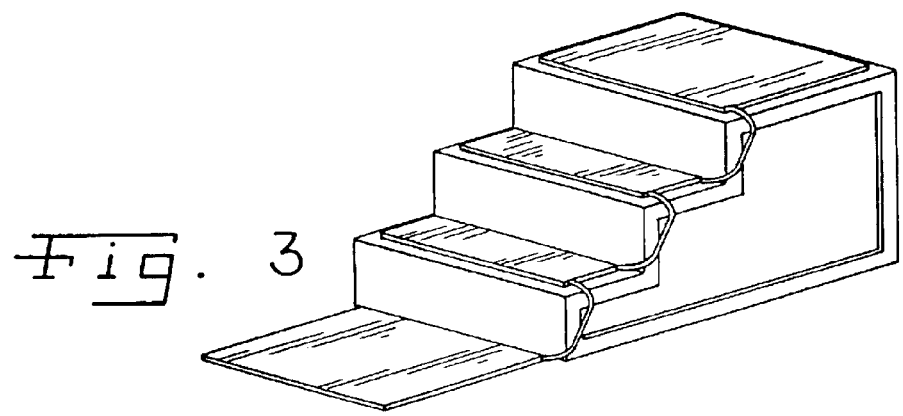
FIG. 3 is a perspective view of an outdoor-use heating mat system in a stairway application in which individual mats are daisy-chained together.
Figure 4:
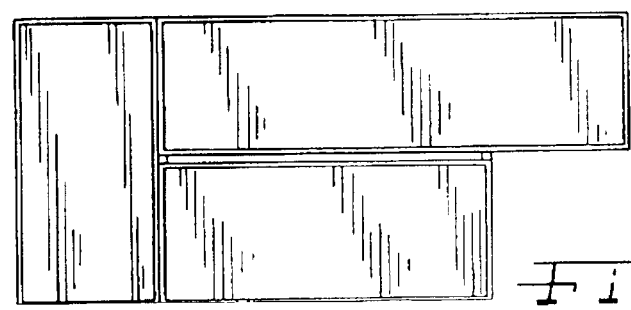
FIG. 4 is a plan view of an outdoor-use heating mat system used in a wheel-chair ramp application.

Outdoor-use heating mat or pad 10 (FIG. 1) is for use on any of a variety of outdoor-traffic surfaces 11 such as steps, sidewalks, driveways, ramps, decks, balconies, porches, bridges, walkways, or other outdoor traffic areas. Outdoor-use heating mat 10 provides sufficient heat to a given outdoor-traffic surface 11 so as to keep it free of ice and/or snow. Examples of the use of heating mats 10 on outdoor-traffic surfaces 11 are seen in FIGS. 2–4.

Outdoor-use heating mat 10 includes a base or first structural layer 12, heating element 14, a plurality of intermediate strips or spacing ribs 16, thermal conductor layer 18, traffic-exposed or second structural layer 20, electrical cord 22, male electrical connector 24, and female electrical connector 26.

Base layer 12 acts as a bottom for heating mat 10 and provides an electrical insulating barrier to the surface to which the mat is applied. In addition to being electrically insulating, the material chosen for base layer 12 should also be durable as heating mat 10 is to be exposed to pedestrian/foot and/or vehicular traffic. Possible candidate materials for such use includes elastomers such as rubber. Specifically, EPDM rubber has been found to be a suitable material for use as base or first structural layer 12.

Base or first structural layer 12 may be made up of any variety of shapes or sizes and will have one or more base edges 28. It is useful for heating mat 10, and therefore, base layer 12, to have a square or rectangular shape as such shapes are generally easy to tightly pack together in a manner that minimizes the amount of uncovered space therebetween.

Heating element 14 is positioned between base layer 12 and thermal conductor layer 18 (or traffic-exposed layer 20, if no thermal conductor layer 18 is employed). Heating element 14 is ideally a self-regulated heating cable, wire, and/or tape (including a multiple combination of such units) spaced underneath traffic-exposed layer 20 in such a manner so as to promote even heating traffic exposed layer 20. As shown in FIG. 1, heating element system 14 includes a series of regularly-spaced heating element extensions 30 electrically connected to a primary heating element expanse 32, with primary expanse 32 being near a base edge 28. Other patterns and/or layouts could also be employed (e.g., a serpentine pattern) could be used for heating element 14.

Figure 5:
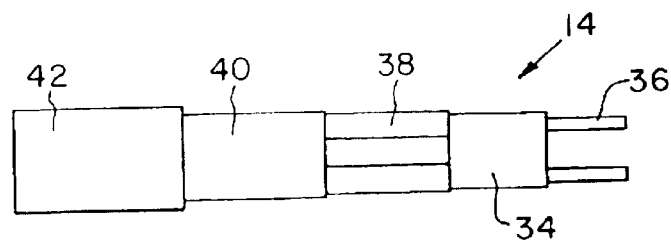
FIG. 5 is a schematic side view of a self-regulating heating cable, known from the prior art and used as one embodiment of the heating element for the present invention.

Self-regulated heating cables or heating tapes 14 include a semiconductive polymeric matrix 34 (FIG. 5), bus conductors 36, polymeric insulator jacket 38, tinned copper or stainless steel braid 40, and fluoropolymer or thermoplastic outer jacket 42. Semiconductive polymer matrix 34 is extruded between and on bus conductors 36 and serves as the heating element. The electrical resistance of the semiconductive polymer matrix varies with temperature in such a fashion that when the temperature of the matrix falls, the power output and hence the heat output thereof increases. Conversely, when the matrix temperature rises, the power output falls. Conductive braid 40, which is optional, can be provided for mechanical protection and/or for an effective earth/ground path for the cable. Fluoropolymer or thermoplastic jacket 42, which is also optional, can be provided for additional mechanical and/or corrosive protection.

Since power output is a function of temperature at any location in the element, the conductive core provided by bus conductors 36 acts as a temperature rheostat to protect against both high and low temperature failure by heating element 14.

Figure 6:
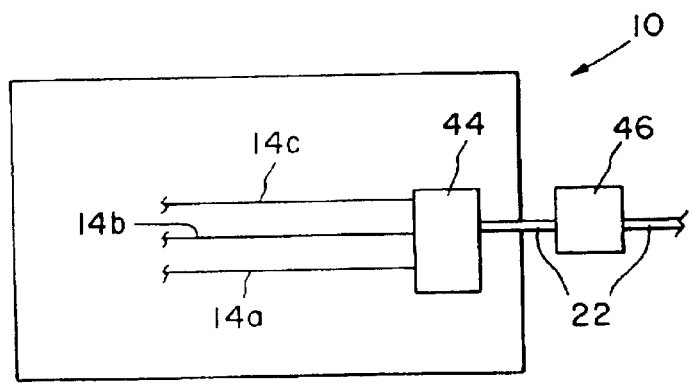
FIG. 6 is a plan, schematic view of an outdoor-use heating mat of the present invention which employs multiple, individually-controllable heating elements therewithin.

One design of outdoor-use heating mat 10 (shown schematically in FIG. 6) includes three spaced-apart self-regulating heating wires 14a, 14b, and 14c, each electrically connected to a temperature switch or controller 44. Temperature switch or controller 44 is illustrated as being connected to electrical cable 22, which advantageously has a surge protector 46 associated therewith, as shown.

The use of a surge protector 46 as part of heating mat 10 is especially useful when larger mat sizes are incorporated. Surge protector 46 would prevent an initial voltage spike from potentially blowing a fuse (not shown) associated with heating mat 10. In this design heating elements 14a–14c are spaced apart from one another (e.g., ¾ inch apart from each other) and are regulated by temperature switch 44 via switch 44, one of heating elements 14a–14c is turned on for a low power setting, two such wires 14a–14c are turned on for a medium power setting, and all three are turned on for a high temperature setting. By choosing the number of heating elements 14a–14c to be powered, the user can decide how much power should be used by the heating mat 10. Alternatively or additionally, temperature switch 44 can be provided with an automatic setting such that the temperature switch 44 would decide how many circuits/heating elements 14a–14c should be powered at any given time. In the design of the heating mat shown in FIG. 6, three watts per foot, six watts per foot or even ten watts per foot over the set of heating elements 14a–14c could be used to achieve the necessary watt density to allow the mat to melt the snow and/or ice at a temperature to which the heating mat 10 is subjected.

Figure 7:
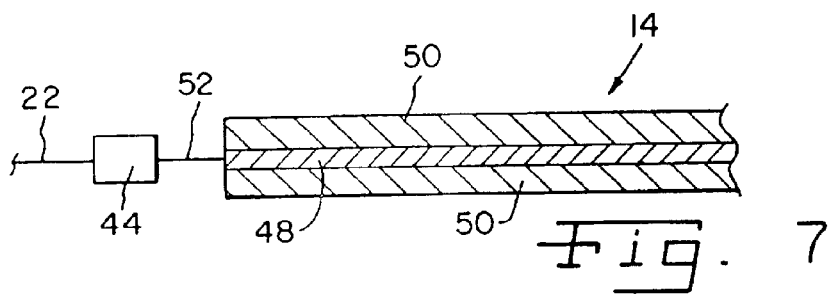
FIG. 7 is a schematic, cross-sectional view of an embodiment of the heating element for the present invention which employs a specially made heat tape.

Alternatively, as shown schematically in FIG. 7, heating element 14 can incorporate a specially made heat tape the size of the entire area of the mat 10, the heat tape 48 being woven into a silicon extrusion 50. Various heat tapes, as well as heating cables, are available for commercial use from B. H. Thermal Corporation (Columbus, Ohio). It is also recognized that other heat tapes/cables from other suppliers could instead be employed with similar success. Heating element 14 of this embodiment further incorporates a constant wattage wire 52 with a low watt density so that it cannot overheat. The heating element 14 of this embodiment is governed by temperature sensor 44. Temperature sensor 44 controls the power available to mat 10 so that less power will be provided to mat 10 as the temperature increases. By reducing the power supplied thereto, mat 10 would not get as hot. Instead of using temperature switch 44 to turn mat 10 on and off, the system embodied in FIG. 7 simply governs the heat output of the mat so that less power is used in warmer temperatures.

As a further alternate embodiment (not shown), multiple strips of heat tape instead of multiple self-regulating wires could be used in a manner similar to the multiple heating wire embodiment discussed above. As such, low, medium and high settings could be achieved using strips of heat tape 48.

It is to be understood that certain features discussed with respect to the particular embodiments could be extended to the other embodiments as well. For example, could be useful to supply a larger mat 10 with a surge protecting device 46 that allows mat 10 to turn on in stages so that the initial amperage spike will not cause a fuse to be blown. Additionally, all mats 10 could be provided with a temperature switch or controller to provide for a low, medium, high, and auto setting, so that the user could control power usage. Furthermore, it is contemplated that surge protector 46 could incorporate a surgister mechanism that would allow mat 10 to turn on in stages so that the initial current spike of activation will not cause a circuit breaker to trip off.

Intermediate strips 16 are laid adjacent to base edges 28, and thereby the edges of mat 10. Additional intermediate strips 16 are located in between heating elements lines or extensions 30. Such a layout of intermediate strips 16 help maintain the regularity of thickness of heating mat 10 by serving as spacers between base layer 12 and traffic-exposed layer 20. Further, intermediate strips 16 help absorb some of the shock of traffic traversing across mat 10 via a transfer of force from traffic-exposed layer 20 therethrough to base layer 12. Intermediate strips 16 are typically approximately ¼ inch strips. However, other thickness may prove appropriate depending on the heating element 14 used. The limiting factor for the choice of a minimum thickness for intermediate strips 16 is the cross-section height of the heating element 14 within heating mat 10. Intermediate strips 16 will advantageously meet and, most ideally, exceed this minimum thickness requirement so that the traffic forces applied to traffic-exposed layer 20 will tend to be directed through intermediate strips 16 instead of through heating element 14. That the intermediate strips 16 allow for little or no force to be carried by heating element 14 is a key feature of the present invention. This feature is important as heating element 14 is most likely the part of the mat most vulnerable to mechanical wear and the portion of the mat most expensive to replace.

Like base layer 12, intermediate strips 16 are advantageously made of a durable and electrically and thermally insulating material. As such, candidate materials for base layer 12 are also suitable material for intermediate strips 16 (e.g., EPDM rubber or other similar materials). Forming intermediate strips 16 of an elastomeric material advantageously increases the ability of such strips to absorb mechanical shock.

Intermediate strips 16 may be mechanically and/or adhesively connected to adjoining base layer 12 and/or traffic-exposed layer 20 (or thermal conductor layer 18, if used). It is further understood that intermediate strips 16 could be formed together with each other and/or together with one of base layer 12 and traffic-exposed layer 20 as an integral unit and still be considered to be within the scope of the present invention.

Thermal conductor layer 18 is optionally included between intermediate strips 16 and traffic-exposed layer 20. The advantage provided by thermal conductor layer 18 is that it allows the heat generated by heating element 14 to be more evenly distributed across traffic-exposed layer 20. A typical material used for thermal conductor layer 18 is aluminum or another durable, heat-conductive material.

Traffic-exposed layer 20 is fixably positioned on intermediate strips 16 and, if employed, thermal conductor layer 18. Traffic-exposed layer 20 has similar material constraints as base layer 12 and intermediate strips 16 (i.e., durable and insulating). Thus, traffic-exposed layer 20 is typically made of a material similar to that used for each of base layer 12 and intermediate strips 16 (e.g., EPDM rubber or other similar material). Traffic-exposed layer 20 is usually at least about ¼ inch thick so as to be durable enough to withstand pedestrian, bicycle, motor vehicle, and/or other types of traffic.

Figure 8:
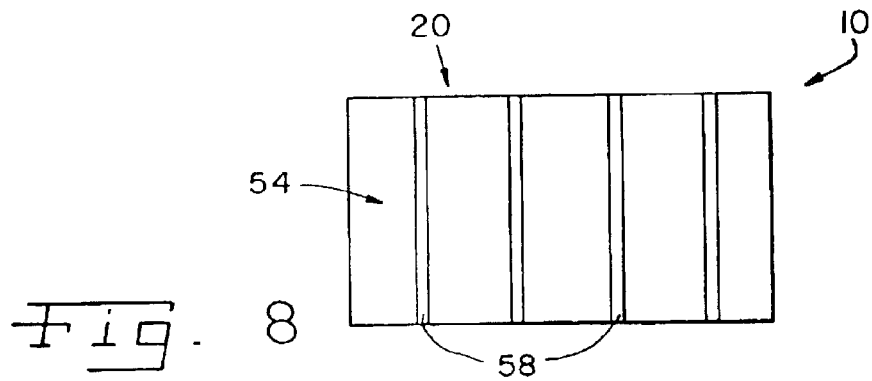
FIG. 8 is a plan view of an embodiment of an outdoor-use heating mat which employs ribbing on its traffic exposed layer.

Traffic-exposed layer 20 has an outer face 54 that is directly subjected to weather elements and to traffic. Therefore, it is useful to provide outer face 54 with treading 56 (as seen in FIG. 1) that provides a "slip-resistance" or "no-skid" effect. Alone or in combination with treading 56, outer face 54 can be provided with ribbing 58 (as shown in FIG. 8) that can promote further traction and act as a means for channeling water off of outer face 54 of traffic-exposed layer 20. Ribs 58 typically extend about ⅛ inch above outer face 54 of traffic-exposed layer 20. Advantageously, traffic-exposed layer 20 is made of a rubber material having a durameter between 60 and 80, approximately. It is possible for a thickness of ⅛ inch to be used for traffic-exposed layer 20, although the use of greater layer thicknesses would likely help extend the life of mat 10.

The watt density for mat 10 is determined by the heat capacity (e.g., the ability thereof to act as heat sink) of mat 10 and especially of traffic-exposed layer 20. The watt density is further determined by the surface conductivity of traffic-exposed layer 20 and, if used, thermal conductor layer 18. Currently, a 2'×3' mat 10 would have a total wattage of approximately 300 W associated therewith.

The combined use of electrical cords 22, male electrical connectors 24, and female electrical connectors 26 permits mat 10 to be electrically connected to a power outlet (not shown) or to other adjoining mats 10. Female connector 26 can be chosen so as to permit a daisy-chain connection between mats. It is to be further understood that temperature controller 44 and/or surge protector 46 can be incorporated within mat 10 or electrically connected within the line of electrical cord 22.

Mats 10 can be affixed alone or in combination with a system to steps, sidewalks, driveways, ramps, decks, balconies, porches, bridges, walkways, or any other surface (see FIGS. 2–4 for examples) where it is necessary or desirable to keep them free of ice and/or snow. These types of surfaces are generically referred to as outdoor-traffic surfaces 11. A number of means can be used for fixing these mats 10 to a given surface 11. These may include bolts, screws, clips, and/or adhesives.

Another viable and potentially advantageous option for the material for base layer 12 and/or traffic-exposed layer 20 is polyurethane, which offers more durability for commercial environments and potentially greater comfort in a walkway setting. At least two potential ways are available for creating non-skid surface on polyurethane. First, the polyurethane could be molded so as to have ribbing and/or a textured surface. As a second option, an otherwise smooth polyurethane surface could have a further adhesive-backed non-skid pad applied thereto. One such non-skid pad is manufactured on 3M and has an aluminum foil backing and a sand paper-like top surface. The use of such a non-skid pad in conjunction with traffic-exposed layer 20 offers the added ability to more uniformly distribute heat across mat 10, via the aluminum foil backing.

A further alternative use for an outdoor heating mat of the present invention is on the floor/base of an outdoor dog house, kennel, or other animal enclosure (not shown). Advantageously, for the comfort of the animal(s) using such an enclosure, the upper surface of a mat used for this purpose would be smooth. When used for such a purpose, a weight sensor system cold be provided to indicate when an animal is laying on the mat and to thereby act a trigger to heat mat to a temperature more comfortable to the animal.

In yet a further embodiment (not shown), each heating mat could employ a traffic-exposed layer 20 made of a clear/transparent polyurethane or similar material and further incorporate a lighting system therewithin. Advantageously, a pressure/weight sensor system would be included for activating the lighting system upon the detection of traffic thereupon. Even yet further advantageously, an automatic off switch, based upon timing and/or a sensed lack of traffic, would also be provided to preclude the need for a manual shutoff of the lighting system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art which this invention pertains and which fall within the limits of the appended claims.

What is claimed is:

1. An outdoor-use heating mat system, said heating mat system including at least one heating mat, at least one said heating mat comprising:
    a first structural layer, said first structural layer being both durable and electrically insulating, said first structural layer having a plurality of first layer edges associated therewith, said first structural layer having a first layer face;
    a heating element positioned adjacent said first layer face;
    a plurality of intermediate strips mounted adjacent said first layer face, each said intermediate strip being positioned proximate at least one of one said first layer edge and said heating element;
    at least one of said plurality of intermediate strips being configured to define at least in part a respective bearing support structure;
    a second structural layer, said second structural layer being both durable and electrically insulating, said second structural layer being fixed relative to said plurality of intermediate strips opposite said first layer face, said first structural layer, said intermediate strips, and said second structural layer, together, forming a element enclosure for said heating element; and
    at least one of a cord and a plug electrically connected to said heating element, said at least one of a cord and a plug extending outside of said element enclosure.

2. The outdoor-use heating mat system of claim 1, wherein at least one of said first structural layer, said second structural layer, and one said intermediate strip is composed of an elastomeric material.

3. The outdoor-use heating mat system of claim 2, wherein said elastomeric material is a rubber material.

4. The outdoor-use heating mat system of claim 1, wherein said first structural layer, said intermediate strips, and said second structural layer, together in combination, are configured for withstanding at least one of foot traffic and motor vehicle traffic.

5. The outdoor-use heating mat system of claim 1, wherein at least one of said first structural layer and said second structural layer is provided with a non-skid surface, each said non-skid surface facing away from said intermediate strips.

6. The outdoor-use heating mat system of claim 1, wherein said heating element is capable of sufficiently heating each of said first structural layer and said second structural layer so as to both induce melting of any snow or ice accumulation on either of said first structural layer and said second structural layer and prevent freezing of any moisture accumulating thereon.

7. The outdoor-use heating mat system of claim 1, wherein said heating element is self-regulating.

8. The outdoor-use heating mat system of claim 1, wherein said heating element is disposed in a pattern relative to said first structural layer and said second structural layer, said pattern being chosen so as promote a substantially even distribution of heat across at least one of said first structural layer and said second structural layer.

9. The outdoor-use heating mat system of claim 8, wherein said pattern effectively includes a series of wiring lines, at least one said intermediate strip being positioned between an otherwise adjacent pair of wiring lines.

10. The outdoor-use heating mat system of claim 1, wherein said intermediate strips are approximately uniform in thickness, said second structural layer thereby being held substantially parallel to said first structural layer via said intermediate strips.

11. The outdoor-use heating mat system of claim 1, wherein said intermediate strips and said heating element together define an intermediate level of a given said heating mat, said intermediate strips and said heating element together occupying substantially all of the available space within said intermediate level.

12. The outdoor-use heating mat system of claim 1, wherein one of said first structural layer and said second structural layer forms an upper-facing layer, said upper-facing layer being exposed to atmospheric elements, said outdoor-use heating mat system further comprising:
    a heat-conductive layer positioned adjacent said upper-facing layer, said heat-conductive layer being substantially located within said element enclosure.

13. The outdoor-use heating mat system of claim 1, wherein said heating mat system is comprised of a plurality of said heating mats, said heating mats each being electrically connected to at least one of a power source and another said heating mat.

14. The outdoor-use heating mat system of claim 1, wherein said heating mats are arranged in a pattern and affixed to at least one of a plurality of steps, a sidewalk, a driveway, a bridge, and a walkway structure.

15. An outdoor-use heating mat, comprising:
a base structural layer having a plurality of base layer edges;
a heating element positioned above said base structural layer;
at least one intermediate strip mounted to said base structural layer, each said intermediate strip being positioned proximate at least one of one said base layer edge and said heating element;
at least one of said at least one intermediate strip being configured to define at least in part a respective bearing support structure;
a traffic-exposed structural layer mounted to said at least one intermediate strip opposite said base structural layer and above said heating element; and
at least one of a cord and a plug electrically connected to said heating element.

16. The outdoor-use heating mat of claim 15, wherein said base structural layer, said at least one intermediate strip, and said traffic-exposed structural layer, together, form an element enclosure for said heating element, said at least one of a cord and a plug extending outside of said element enclosure.

17. The outdoor-use heating mat of claim 15, wherein said base structural layer, said at least one intermediate strip, and said traffic-exposed structural layer, together, are configured for withstanding at least one of foot traffic and motor vehicle traffic.

18. The outdoor-use heating mat of claim 15, further comprising at least one additional heating element and a temperature controller, said heating mat thereby having a plurality of said heating elements, said temperature controller being individually and separately connected to each said heating element, said temperature controller thereby being able to separately at least one of activate and control each said heating element.

19. The outdoor-use heating mat of claim 18, wherein said temperature controller is configured for activating a selected number of said heating elements, said selected number of said heating elements corresponding to a particular heating setting for said heating mat.

20. An outdoor-use heating mat, comprising:
a traffic-exposed structural layer having a plurality of layer edges, said traffic-exposed layer having a first traffic-exposed face and a second ground-directed face;
a heating element fixedly positioned adjacent said second ground-directed face of said traffic-exposed structural layer;
a plurality of intermediate strips mounted fixedly proximate and relative to said second ground-directed face of said traffic-exposed structural layer, each said intermediate strip being positioned proximate at least one of one said layer edge and said heating element;
at least one of said plurality of intermediate strips being configured to define at least in part a respective bearing support structure; and
at least one of a cord and a plug electrically connected to said heating element.

21. The outdoor-use heating mat system of claim 1, wherein at least one of said plurality of intermediate strips being configured in a substantially non-overlapping relationship relative to said heating element.

22. The outdoor-use heating mat system of claim 1, wherein at least one of said plurality of intermediate strips being suitably dimensioned and arranged relative to said heating element to define a respective bearing support surface being closer to said first structural layer than said heating element or being at a substantially equivalent distance away from said first structural layer as said heating element.

23. The outdoor-use heating mat of claim 15, wherein at least one of said at least one intermediate strip being configured in a substantially non-overlapping relationship relative to said heating element.

24. The outdoor-use heating mat of claim 15, wherein at least one of said at least one intermediate strip being suitably dimensioned and arranged relative to said heating element to define a respective bearing support surface being closer to said traffic-exposed structural layer than said heating element or being at a substantially equivalent distance away from said traffic-exposed structural layer as said heating element.

25. The outdoor-use heating mat of claim 20, wherein at least one of said plurality of intermediate strips being configured in a substantially non-overlapping relationship relative to said heating element.

26. The outdoor-use heating mat system of claim 20, wherein at least one of said plurality of intermediate strips being suitably dimensioned and arranged relative to said heating element to define a respective bearing support surface being closer to said traffic-exposed structural layer than said heating element or being at a substantially equivalent distance away from said traffic-exposed structural layer as said heating element.

* * * * *